US012680654B2

(12) United States Patent
Kim et al.

(10) Patent No.: US 12,680,654 B2
(45) Date of Patent: Jul. 14, 2026

(54) VEHICLE FLUID STORAGE DEVICE AND METHOD OF MANUFACTURING THE SAME

(71) Applicant: KOREA FUEL-TECH CORPORATION, Anseong-si (KR)

(72) Inventors: Ki Hong Kim, Anseong-si (KR); Dong Chul Lee, Hwaseong-si (KR); Myung Keun Chae, Anseong-si (KR); Seung Jin Yang, Anseong-si (KR)

(73) Assignee: KOREA FUEL-TECH CORPORATION, Anseong-si (KR)

( * ) Notice: Subject to any disclaimer, the term of this patent is extended or adjusted under 35 U.S.C. 154(b) by 0 days.

(21) Appl. No.: 18/825,741

(22) Filed: Sep. 5, 2024

(65) Prior Publication Data

US 2025/0137597 A1 May 1, 2025

(30) Foreign Application Priority Data

Oct. 31, 2023 (KR) ........................ 10-2023-0147876

(51) Int. Cl.
*F17C 13/06* (2006.01)

(52) U.S. Cl.
CPC ...... *F17C 13/06* (2013.01); *F17C 2205/0305* (2013.01); *F17C 2209/221* (2013.01); *F17C 2260/036* (2013.01)

(58) Field of Classification Search
CPC .............. F17C 13/06; F17C 2205/0305; F17C 2209/221; F17C 2260/036; F17C 2205/0142; F17C 2205/0146; F17C 1/16; F17C 13/002; F17C 2201/0128; F17C 2201/056; F17C 2203/0663;
(Continued)

(56) References Cited

U.S. PATENT DOCUMENTS

| | | | | |
|---|---|---|---|---|
| 3,432,072 A * | 3/1969 | Quercia | B29C 66/12469 220/613 |
| 5,429,845 A * | 7/1995 | Newhouse | F17C 1/16 220/582 |
| 12,252,297 B2 * | 3/2025 | Kim | B65D 25/38 |

(Continued)

FOREIGN PATENT DOCUMENTS

| | | | | |
|---|---|---|---|---|
| CN | 115899541 A * | 4/2023 | F16J 12/00 |
| JP | 2005-265138 A | 9/2005 | |

(Continued)

OTHER PUBLICATIONS

English Machine Translation of WO-2022245008-A1 (Year: 2022).*

(Continued)

*Primary Examiner* — Laura E. Parker

(57) ABSTRACT

A vehicle fluid storage device according to the present disclosure include a storage container having a fluid storage space formed inside and an opening portion formed at least one of one side and the other side, a first connector including a first connection region arranged adjacent to the opening portion on the inside of the storage container and a second connection region extending from the first connection region so as to be connectable to an external device, and a holder connected to the first connection region between the storage container and the first connection region and coupled to the storage container by welding.

11 Claims, 9 Drawing Sheets

(58) Field of Classification Search
CPC ...... F17C 2205/0311; F17C 2209/2118; F17C 2209/2127; F17C 2270/0178
USPC ........................................ 220/601, 581
See application file for complete search history.

(56) References Cited

U.S. PATENT DOCUMENTS

| | | | | |
|---|---|---|---|---|
| 2011/0220661 | A1* | 9/2011 | Strack | F17C 13/002 220/601 |
| 2019/0170300 | A1* | 6/2019 | Cola | F17C 13/00 |
| 2023/0312180 | A1 | 10/2023 | Kim et al. | |

FOREIGN PATENT DOCUMENTS

| | | | | | |
|---|---|---|---|---|---|
| JP | 2015-17709 | A | | 1/2015 | |
| KR | 10-2018-0002160 | A | | 1/2018 | |
| KR | 20190061605 | A | * | 6/2019 | B60K 15/03177 |
| KR | 10-2242337 | B1 | | 6/2021 | |
| KR | 20220160149 | A | * | 12/2022 | F17C 1/005 |
| KR | 10-2023-0140225 | A | | 10/2023 | |
| WO | WO-2022245008 | A1 | * | 11/2022 | F17C 13/002 |

OTHER PUBLICATIONS

English Machine Translation of KR-20220160149-A (Year: 2022).*
English Machine Translation of CN-115899541-A (Year: 2023).*
English Machine Translation of KR-20190061605-A (Year: 2019).*

* cited by examiner

400(410): 411, 412, 413

VEHICLE FLUID STORAGE DEVICE AND METHOD OF MANUFACTURING THE SAME

CROSS REFERENCE TO RELATED APPLICATION

This application claims priority from Korean Patent Application No. 10-2023-0147876, filed on Oct. 31, 2023, which is hereby incorporated by reference in its entirety.

BACKGROUND

Field

The present disclosure relates to a vehicle fluid storage device and a method of manufacturing the same, and more specifically, to a vehicle fluid storage device that is installed in a vehicle to store fluids such as gas and liquid and a method of manufacturing the same.

Related Art

Generally, a vehicle fluid storage device that stores gas and liquid for various purposes is installed in a vehicle. Such vehicle fluid storage devices are increasingly being used due to the advantage of being able to stably store low-pressure and high-pressure fluids along with the development of eco-friendly energy.

The technology for the conventional fluid storage device has already been disclosed by "Korean Patent No. 10-2242337 (High-Pressure Gas Storage Pressure Vessel Manufacturing Device, Apr. 14, 2021)". The above registered patent is characterized by implementing excellent pressure resistance performance by reinforcing the causticity.

However, most conventional fluid storage devices are made of metal and aluminum to ensure stability. Accordingly, fluid storage devices made of metal and aluminum have problems such as being too heavy to be installed in vehicles and incurring excessive manufacturing costs. In addition, there are many factors limiting space when installed in vehicles. Accordingly, there is a need for a vehicle fluid storage device made of plastic material, but there is a problem that it is difficult to overcome stability.

SUMMARY

A purpose of the present disclosure is to provide a vehicle fluid storage device that couples a metal or aluminum connector and a plastic material container and a method of manufacturing the same.

According to an aspect of the present disclosure, there is provided a vehicle fluid storage device including: a storage container having a fluid storage space formed inside and an opening portion formed at least one of one side and the other side; a first connector including a first connection region arranged adjacent to the opening portion on the inside of the storage container and a second connection region extending from the first connection region so as to be connectable to an external device; and a holder connected to the first connection region between the storage container and the first connection region and coupled to the storage container by welding.

The vehicle fluid storage device may further include a second connector connected to the first connector so as to surround at least a portion of the first connector.

The storage container and the holder may include a plastic material, the first and second connectors may include at least one material of metal and aluminum, and the first connection region and the holder may be connected by insert injection.

A bur receiver configured to accommodate burr generated by the welding may be formed between the storage container and the holder.

The burr receiver may be formed to be recessed in an outer diameter portion of the holder facing an inner wall of the storage container.

The burr receiver may be formed to be recessed in the second connector between the storage container and the holder.

The second connector may be fastened to the second connection region and be in close contact with the first connection region and an end portion of the storage container.

The vehicle fluid storage device may further include a leak-preventing section configured to maintain airtightness between the first and second connectors.

The leak-preventing section may include at least one of an O-ring and an injection-molded backup ring.

The leak-preventing section may include a first ring member arranged between the holder that surrounds the first connection region and the second connector, a second ring member arranged adjacent to an end of the holder between the first connection region and the second connection region, and a third ring member arranged between the first connection region and the second connection region.

The holder may further include at least one insertion member inserted into at least one connection groove formed to be recessed in the first connection area, and at least one of the insertion members has a cross-section tapered from the inside of the connection groove to the outside of the connection groove.

The vehicle fluid storage device may further include a reinforcing layer arranged to surround at least one region of the storage container and the first and second connectors to reinforce strength, and the reinforcing layer may include at least one of a carbon fiber composite material and a glass fiber composite material.

The storage container may be formed by blow molding.

The welding may include at least one of spin welding and laser welding.

According to another aspect of the present disclosure, there is provided a method of manufacturing a vehicle fluid storage device including a storage container having a fluid storage space formed inside and an opening portion formed at least one of one side and the other side, a first connector including a first connection region arranged adjacent to the opening portion on the inside of the storage container and a second connection region extending from the first connection region so as to be connectable to an external device, and a holder connected to the first connection region between the storage container and the first connection region and coupled to the storage container by spin welding, the method including: forming an assembly of the first connector and the holder; and positioning the first connector adjacent to the opening portion and coupling the holder and the storage container by welding.

According to still another aspect of the present disclosure, there is provided an assembly of a vehicle fluid storage device, the assembly including: a plurality of the vehicle fluid storage devices; and a connection section configured to connect the fluid storage devices to an external device, in which each of the fluid storage devices includes a storage container having a fluid storage space formed inside and an opening portion formed at least one of one side and the other side, a first connector including a first connection region arranged adjacent to the opening portion on the inside of the storage container and a second connection region extending from the first connection region so as to be connectable to the connection section, and a holder connected to the first connection region between the storage container and the first connection region and coupled to the storage container by welding.

According to the vehicle fluid storage device and the method of manufacturing the same of the present disclosure, it is possible to secure stability while reducing weight and manufacturing cost by coupling a metal or aluminum connector and a plastic material container.

The technical effects of the present disclosure as mentioned above are not limited to the effects mentioned above, and other technical effects not mentioned can be clearly understood by those skilled in the art from the description below.

DESCRIPTION OF EXEMPLARY EMBODIMENTS

Figure 1:
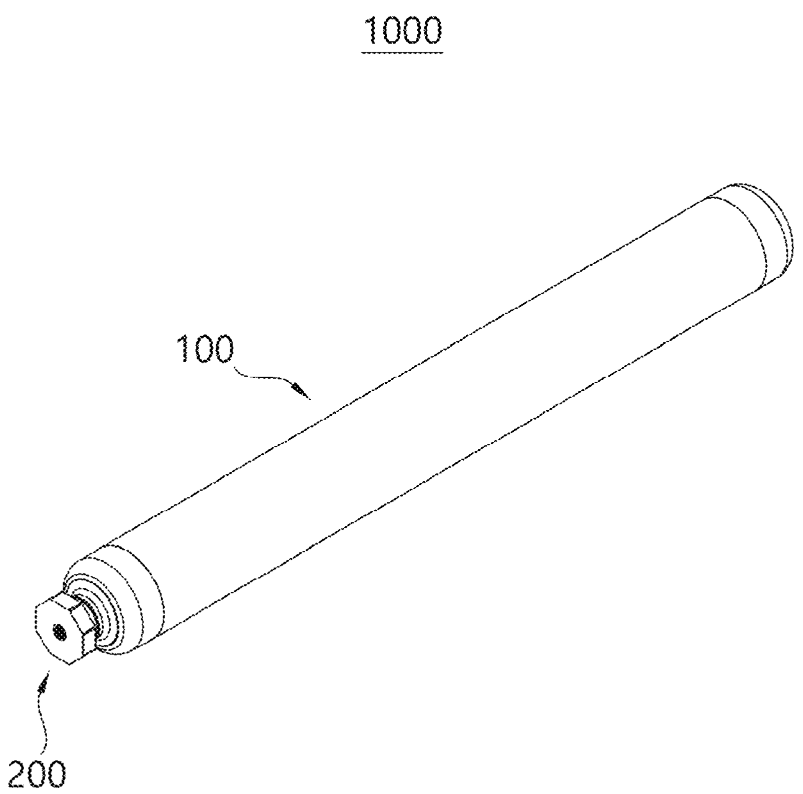
FIG. 1 is a perspective view schematically illustrating a vehicle fluid storage device according to a first embodiment.

Hereinafter, an embodiment of the present invention will be described in detail with reference to the attached drawings. However, the present embodiment is not limited to the embodiments disclosed below, but can be implemented in various forms, and the present embodiment is provided only to completely disclose the present invention and to completely inform a person having ordinary knowledge of the scope of the invention. The shapes of elements in the drawings may be exaggerated for a clearer explanation, and elements indicated by the same symbols in the drawings mean the same elements.

Figure 2:
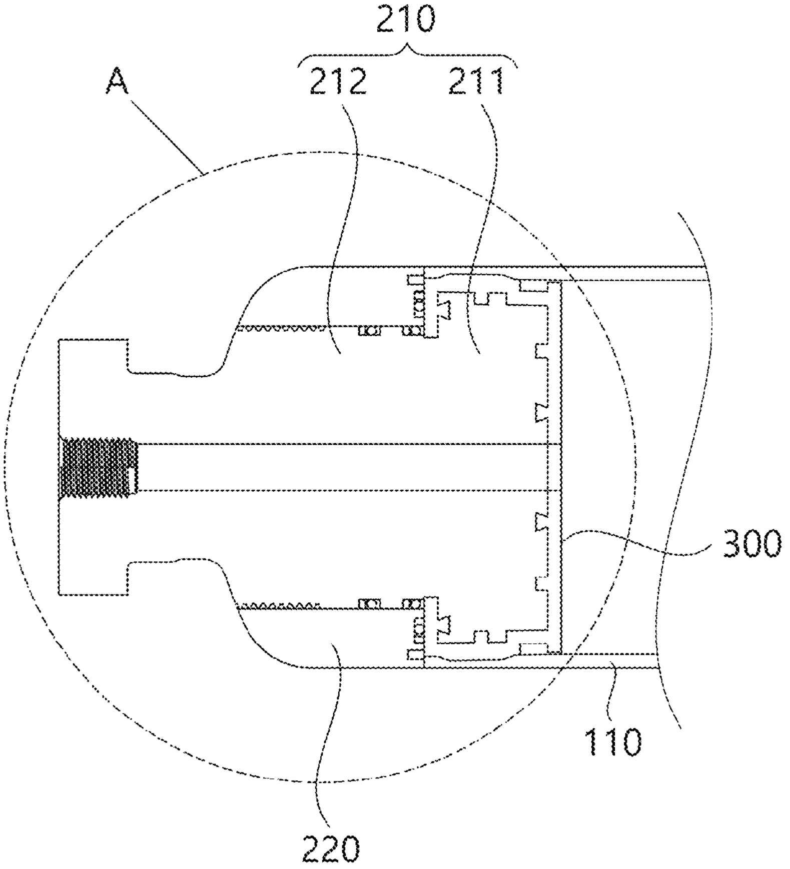
FIG. 2 is a cross-sectional view schematically illustrating the vehicle fluid storage device according to the first embodiment.
Figure 3:
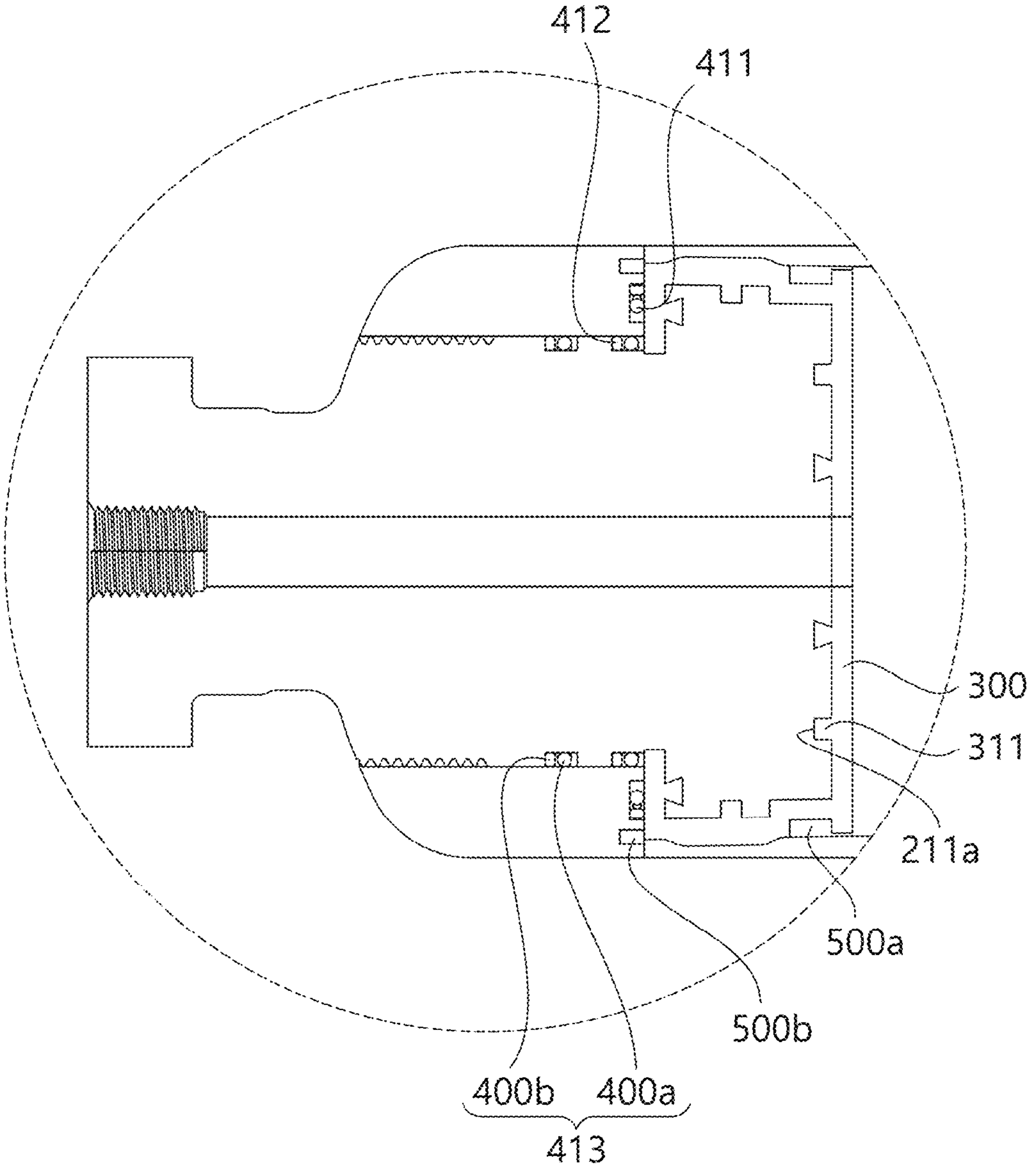
FIG. 3 is an enlarged view illustrating "A" of the vehicle fluid storage device according to the first embodiment illustrated in FIG. 2.

FIG. 1 is a perspective view schematically illustrating a vehicle fluid storage device according to a first embodiment, FIG. 2 is a cross-sectional view schematically illustrating the vehicle fluid storage device according to the first embodiment, and FIG. 3 is an enlarged view illustrating "A" of the vehicle fluid storage device according to the first embodiment illustrated in FIG. 2.

As illustrated in FIGS. 1 to 3, a vehicle fluid storage device 1000 (hereinafter, referred to as a storage device) according to the first embodiment may be a low-pressure storage device or a high-pressure storage device, for example, having an outer diameter of 50 to 200 mm and a length of 500 to 2000 mm. However, this is for explaining the present embodiment, and the shape and type of the storage device are not limited.

This storage device 1000 includes a storage container 100, a connector 200, a holder 300, and a leak-preventing section 400.

The storage container 100 forms a space in which a fluid is stored inside.

The storage container 100 is made of a plastic material such as nylon, and may be made in a cylindrical shape that is long in one direction. In addition, the storage container 100 may be made to have a partially elliptical shape, and may have a structure that supports an elliptical region and prevents rotation during the rotational fusion described later. However, this is for explaining the present embodiment, and the shape of the storage container 100 is not limited.

Figure 9:
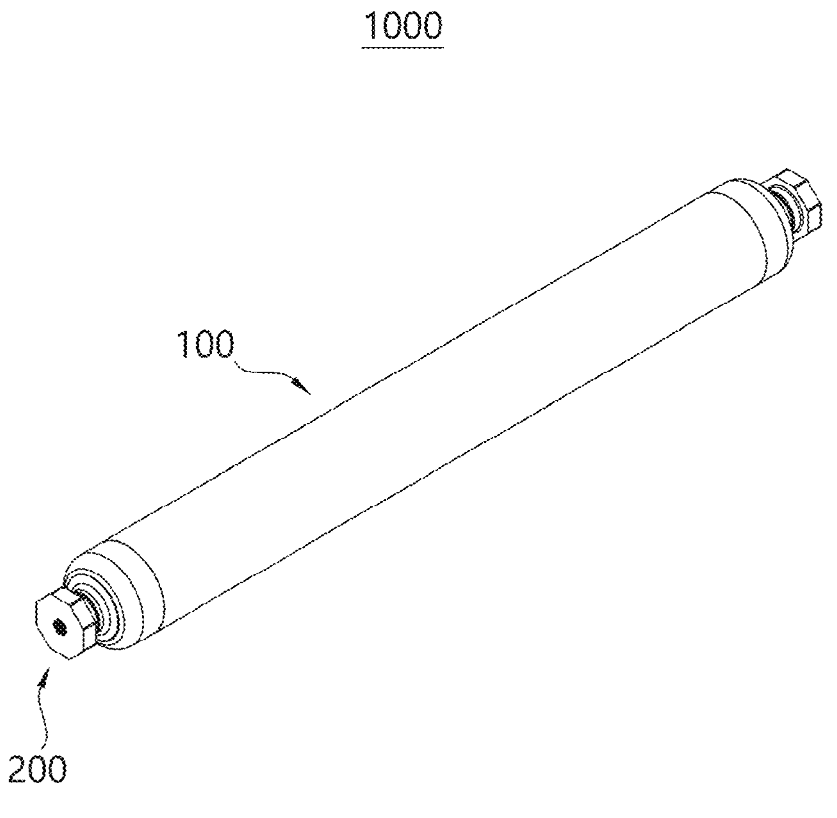
FIG. 9 is a perspective view schematically illustrating that opening portions are formed on both sides of the vehicle fluid storage device according to the first embodiment.

The storage container 100 may have a closed shape on one side of the container body 110, and an opening portion may be formed on the other side to allow the fluid to flow out and discharge. However, this is for explaining the present embodiment, and as illustrated in FIG. 9, the container body 110 may have opening portions formed on both sides.

Meanwhile, the connector 200 may include a first connector 210 and a second connector 220. For example, the first connector 210 and the second connector 220 may be made of metal or aluminum.

The first connector 210 may include a first connection region 211 and a second connection region 212 extending from the first connection region 211.

The first connection region 211 is arranged in the opening portion of the storage container 100. The first connection region 211 is connected to the storage container 100 by the holder 300 to close the opening portion of the storage container 100. Here, the holder 300 may be arranged to surround the first connection region 211 by avoiding the second connection region 212 extending from the first connection region 211.

Moreover, the second connection region 212 may be arranged to extend from the center of the first connection region 211 and have a diameter smaller than the diameter of the first connection region 211. In addition, a hollow space may be formed in the first connection region 211 and the second connection region 212 to form a fluid inflow/outflow path between an external device (not illustrated) and the storage container 100. Here, a recessed portion may be formed in an outer diameter portion of a free end of the second connection region 212 for connection with the external device, and a screw thread may be formed in an inner diameter portion, that is, the hollow space.

Meanwhile, the second connector 220 is arranged to wrap around a part of the second connection region 212 on the outside of the second connection region 212. In this case, the second connector 220 is fastened to a screw thread formed on the outer diameter portion of the second connection region 212. Accordingly, the second connector 220 is in close contact with the holder 300 wrapping around the first connection region 211 and reinforces the space between the first connection region 211 and the storage container 100. The second connector 220 has a shape in which one region is bent toward the front and exposes the recessed portion of the second connection region 212.

Meanwhile, the holder 300 is arranged to wrap around the first connection region 211 of the first connector 210. The holder 300 may be prepared with a plastic material such as nylon and may be prepared to wrap around the first connection region 211 by insert injection.

For example, the holder 300 may be arranged to surround one surface of the first connection region 211 facing the inside of the storage container 100, a side surface of the first connection region 211 adjacent to the inner wall of the storage container 100, and the other surface of the first connection region 211 which is a surface adjacent to the first connection region 211 and the second connector 212.

Here, the holder 300 may include an insertion member 311 that is inserted into each of a plurality of connection grooves 211*a* that are recessed and formed in the first connection region 211.

For example, a portion of the insertion member 311 inserted into one surface of the first connection region 211 and the insertion members 311 inserted from the adjacent surface of the first connection region 211 and the second connector 220 toward the first connection region 211 are provided to have a shape tapered from the inside of the connection groove 211*a* toward the outside of the connection groove 211*a* so that the holder 300 and the first connector 210 are firmly connected. In addition, the insertion member 311 inserted into the side surface of the first connection region 211 and a portion of the insertion member 311 inserted into one surface of the first connection region 211 may be formed in a rod shape instead of a tapered shape. However, this is for explaining the present embodiment and does not limit the shape of the insertion members 311.

Meanwhile, the holder 300 may be coupled with the storage container 100 in various ways, such as spin welding and laser welding in a state of being connected to the first connector 210 and the second connector 220 by a manufacturing method described below. For example, in the spin welding, a burr is generated between the storage container 100 and the holder 300. Accordingly, a burr receiver 500*a* is formed to be recessed in a region of the holder 300 facing the inner wall of the storage container 100 so that the burr is accommodated between the storage container 100 and the holder 300. In addition, in the spin welding, a burr may also be generated between the second connector 220, the storage container 100, and the holder 300. Accordingly, a burr receiver 500*b* may be formed to be recessed in a region of the second connector 220 adjacent to the end portion of the storage container 100.

Meanwhile, the leak-preventing section 400 may include a sealing member 410. The sealing member 410 prevents gas that may be generated during the supply and use of fluid into the storage container 100 from leaking to the outside of the storage device 1000 through the connection section.

The sealing member 410 may be made of various materials such as plastic, metal, and aluminum, and may be arranged at least one or more at the same location. In this case, each of the sealing members 410 may be provided as a combination of an O-ring 410*a* and an injection-molded backup ring 410*b*.

The sealing member 410 may include a first ring member 411, a second ring member 412, and a third ring member 413.

The first ring member 411 may be arranged to be inserted into the second connector 220 facing the other surface of the first connection region 211 to maintain airtightness between the holder 300 surrounding the other surface of the first connection region 211 and the second connector 220.

The first ring member 411 can prevent gas that may leak between the storage container 100 and the holder 300 from being discharged to the outside.

In addition, the second ring member 412 may be arranged to be inserted into the second connection region 212 with the end of the holder 300 between the first connection region 211 and the second connection region 212. When leakage occurs in the first ring member 411, the second ring member 412 can prevent the leaked gas from leaking to the outside through between the second connection region 212 and the second connector 220 and between the first connection region 211 and the holder 300.

Moreover, the third ring member 413 may be arranged to be inserted into the second connection region 212 between the second connection region 212 and the second connector 220. When leakage occurs in the first ring member 411 and the second ring member 412, the third ring member 413 can prevent the leaked gas from leaking to the outside through the connection section of the first connector 210 and the second connector 220.

In this way, the storage device 1000 has the advantage of reducing the overall weight by coupling the connector 200 formed of metal or aluminum to the storage container 100 made of plastic material through the holder 300 made of plastic material, while firmly connecting the storage container 100 and the holder 300 through spin welding.

Meanwhile, below, a detailed description will be given of a method of manufacturing the vehicle fluid storage device according to the first embodiment with reference to the attached drawings. However, a detailed description of the components described above will be omitted and the same reference numerals will be given to the components.

Figure 4:
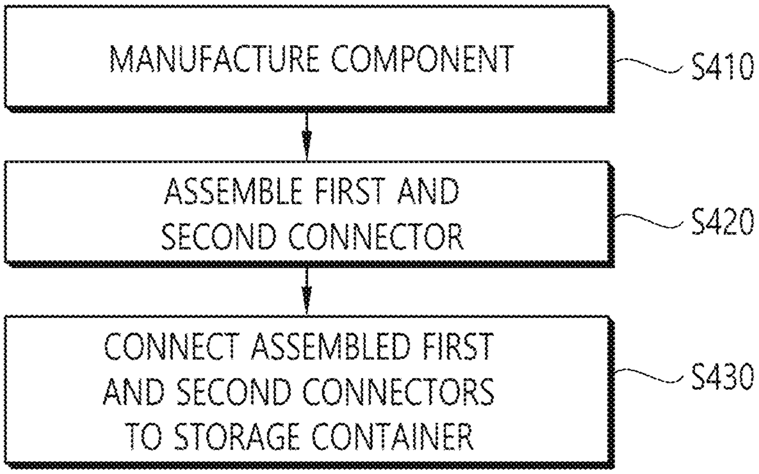
FIG. 4 is a flowchart illustrating a method of manufacturing the vehicle fluid storage device according to the first embodiment.

FIG. 4 is a flowchart illustrating the method of manufacturing the vehicle fluid storage device according to the first embodiment.

As illustrated in FIG. 4, in manufacturing the storage device 1000 according to the first embodiment, components of the storage device 1000 may be manufactured first (S410).

For example, the storage container 100 may be manufactured by blow molding. Then, the first connector 210 and the second connector 220 are manufactured. In this case, the first connector 210 and the holder 300 may be manufactured by insert injection so that the holder 300 surrounds the first connection region of the first connector 210. Moreover, the first ring member 411 may be connected to the second connector 220, and the second ring member 412 and the third ring member 413 may be connected to the first connector 210.

After that, the first connector 210 and the second connector 220 equipped with the sealing member 410 are assembled (S420). In this case, the first connector 210 and the second connector 220 can be firmly connected through the screw thread formed between the first connector 210 and the second connector 220.

After that, the assembled first connector 210 and the second connector 220 are connected to the storage container 100 (S430). In this case, the connector 200 and the storage container 100 are firmly connected by spin welding. At this time, due to the spin wedding, a burr may be generated between the holder 300 and the storage container 100 and between the storage container 100 and the second connector 220, and the generated burr is accommodated in the burr receivers 500*a* and 500*b* formed in each of the holder 300 and the second connector 220, and deformation of the outer shape of the storage container 100 can be prevented.

Figure 5:
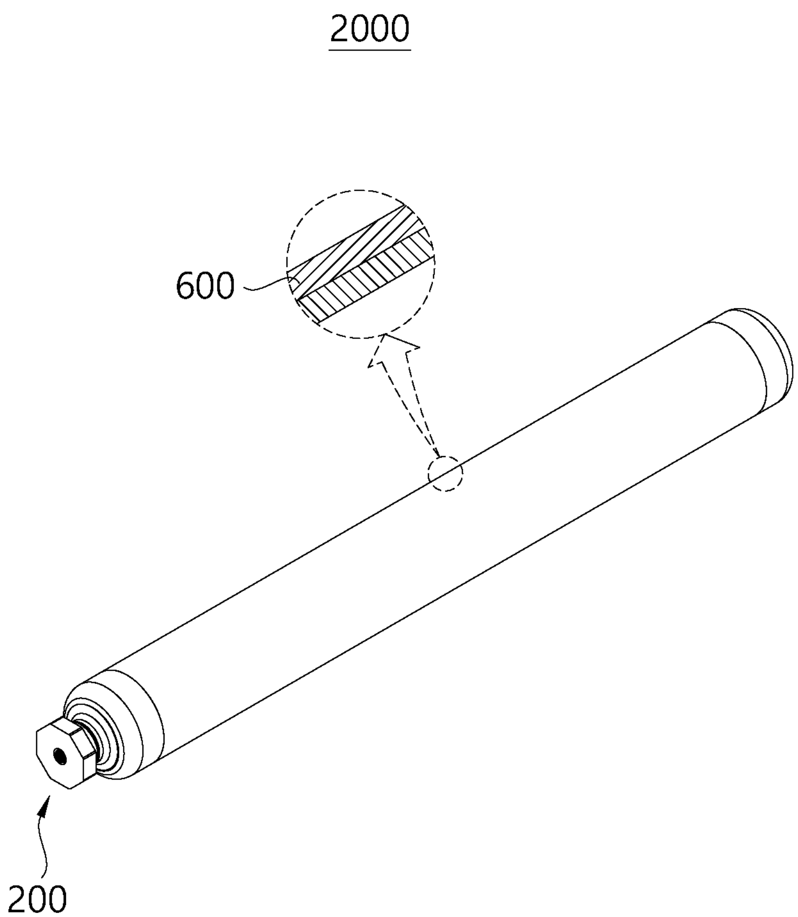
FIG. 5 is a perspective view schematically illustrating a vehicle fluid storage device according to a second embodiment.
Figure 6:
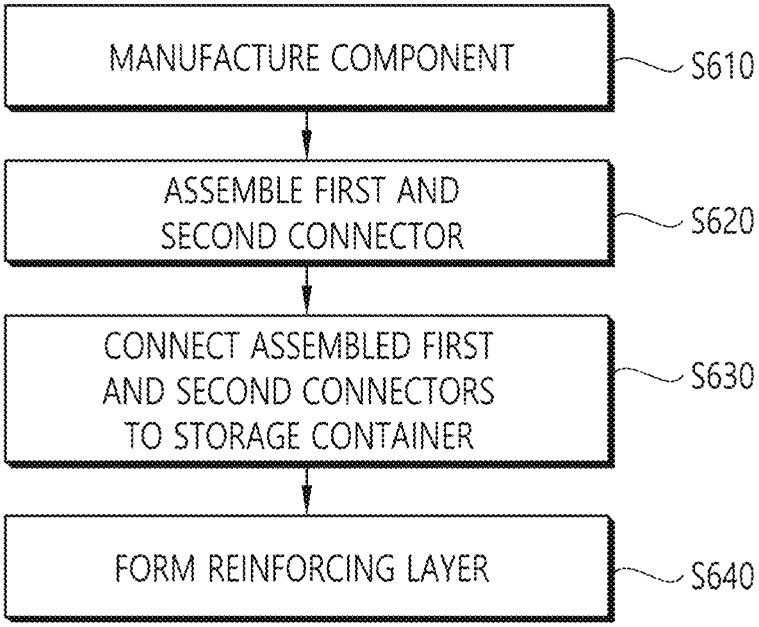
FIG. 6 is a flowchart illustrating a method of manufacturing the vehicle fluid storage device according to the second embodiment.

FIG. 5 is a perspective view schematically illustrating a vehicle fluid storage device according to a second embodiment, and FIG. 6 is a flowchart illustrating a method of manufacturing the vehicle fluid storage device according to the second embodiment.

As illustrated in FIG. 5 and FIG. 6, the vehicle fluid storage device 2000 (hereinafter, referred to as a storage device) according to the second embodiment may be a low-pressure storage device or a high-pressure storage device, for example, having an outer diameter of 50 to 200 mm and a length of 500 to 2000 mm. However, this is for explaining the present embodiment and the shape and type of the storage device are not limited.

This storage device 2000 may include a storage container 100 in which an opening portion is formed on one or both sides as illustrated in FIG. 5 and FIG. 9. Moreover, the storage container 100 may be equipped with a connector 200, a holder 300, a leak-preventing section 400, and a reinforcing layer 600.

For example, the storage container 100, the connector 200, the holder 300, and the leak-preventing section 400 may be provided in the same form as the storage device 1000 described in the first embodiment. However, the storage device 2000 according to the second embodiment may additionally include the reinforcing layer 600. The reinforcing layer 600 may include a carbon fiber composite or a glass fiber composite, and may be formed to surround at least a part of the storage container 100 and the connector.

For example, in the production of the storage device 2000, the storage container 100 may be produced by blow molding. Then, a first connector 210 and a second connector 220 are manufactured. In this case, the first connector 210 and the holder 300 may be manufactured by insert injection so that the holder 300 surrounds the first connection region 211. Moreover, the first ring member 411 may be connected to the second connector 220, and the second ring member 412 and the third ring member 413 may be connected to the first connector 210 (S610).

Thereafter, the first connector 210 and the second connector 220 equipped with the sealing member 410 are assembled (S620).

Thereafter, the assembled first connector 210 and the second connector 220 are connected to the storage container 100 (S630). In this case, the connector 200 and the storage container 100 are firmly connected by spin welding.

Thereafter, the reinforcing layer 600 may be formed to surround the storage container 100 and the connector 200 (S640). In the formation of this reinforcing layer 600, deformation may occur in the storage container 100 due to spin welding of the connector 200 and the storage container 100. Therefore, the reinforcing force of the reinforcing layer 600 may be reduced. However, in the storage device 2000, since the burr is received in the bur receivers **500*a* and 500*b* formed in the second connector 220 and the holder 300, it is possible to prevent the reduction in the reinforcing force of the reinforcing layer 600** in advance.

Meanwhile, a plurality of the storage devices 1000 and 2000 may be arranged as needed to form a storage device assembly. Hereinafter, the storage device assembly and a method of manufacturing the same will be described in detail with reference to the attached drawings.

Figure 7:
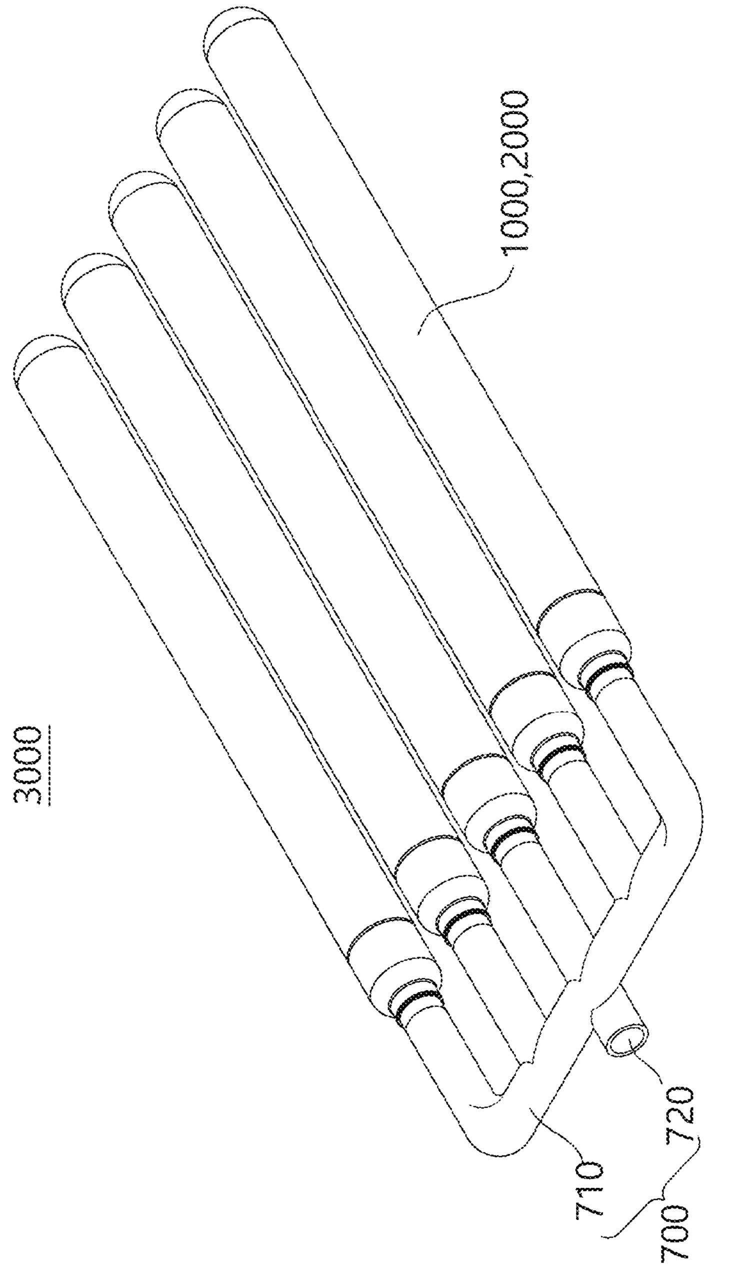
FIG. 7 is a perspective view schematically illustrating an assembly of a vehicle fluid storage device according to a third embodiment.
Figure 8:
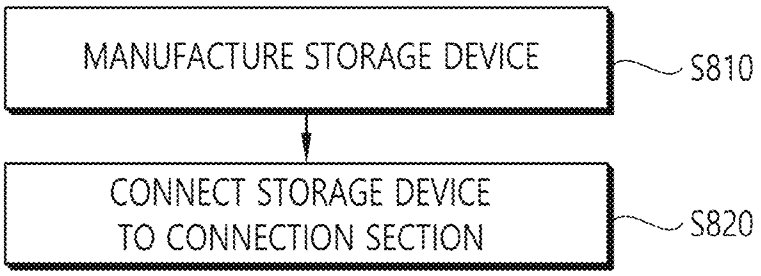
FIG. 8 is a flowchart illustrating a method of manufacturing the assembly of the vehicle fluid storage device according to the third embodiment.

FIG. 7 is a perspective view schematically illustrating an assembly of a vehicle fluid storage device according to a third embodiment, and FIG. 8 is a flowchart illustrating a method of manufacturing the assembly of the vehicle fluid storage device according to the third embodiment.

As illustrated in FIGS. 7 and 8, an assembly 3000 of the vehicle fluid storage device according to the third embodiment may be formed by coupling a plurality of storage devices 1000 and 2000.

In this case, the assembly 3000 of the storage device may include a plurality of low-pressure containers or a plurality of high-pressure containers, or a combination of low-pressure containers and high-pressure containers.

First, in order to manufacture the assembly 3000 of the storage device, the plurality of storage devices 1000 and 2000 are completed (S810). Thereafter, the plurality of storage devices 1000 and 2000 are arranged in parallel according to various types of mounting spaces, such as internal combustion engines and electric vehicles, in which the storage device assembly 3000 is mounted, and the storage devices 1000 and 2000 are connected to a fluid line connection section 700 (S820).

The fluid line connection section 700 may include a branch pipe 710 corresponding to the number of storage devices 1000 and 2000 and a single connecting pipe 720 connected to an external device.

However, this is for explaining the present embodiment and does not limit the shape of the fluid line connection section 700.

Accordingly, the assembly of the storage device can increase the fluid storage capacity by coupling a plurality of storage devices 1000 and 2000, and can be easily arranged and mounted according to various types of mounting spaces such as internal combustion engines and electric vehicles.

In this way, according to the vehicle fluid storage device and the method of manufacturing the same of the present disclosure, it is possible to secure stability while reducing weight and manufacturing costs by coupling the metal or aluminum connector and the plastic container.

The embodiments of the present invention described above and illustrated in the drawings should not be construed as limiting the technical idea of the present invention. The protection scope of the present invention is limited only by the matters described in the claims, and a person having ordinary knowledge in the technical field of the present invention can improve and change the technical idea of the present invention in various forms. Accordingly, such improvements and modifications will fall within the scope of protection of the present invention as long as they are obvious to a person having ordinary skill in the art.

What is claimed is:

1. A vehicle fluid storage device comprising:

a storage container having a fluid storage space formed inside and an opening portion formed on at least one side;

a first connector including a first connection region arranged adjacent to the opening portion on the inside of the storage container and a second connection region extending from the first connection region so as to be connectable to an external device;

a holder connected to the first connection region between the storage container and the first connection region and coupled to the storage container by welding;

a second connector connected to the first connector so as to surround at least a portion of the first connector, wherein the second connector is fastened to the second connection region and is contact with the holder; and a leak-preventing section configured to maintain airtightness between the first and second connectors, wherein the leak-preventing section includes:

a first ring member arranged between the holder that surrounds the first connection region and the second connector;

a second ring member arranged adjacent to an end of the holder between the first connection region and the second connection region; and a third ring member arranged between the first connection region and the second connection region.

2. The vehicle fluid storage device of claim 1, wherein the storage container and the holder include a plastic material, the first and second connectors each include metal, and the first connection region and the holder are connected by insert injection.

3. The vehicle fluid storage device of claim 1, wherein a burr receiver configured to accommodate a burr generated by the welding is formed between the storage container and the holder.

4. The vehicle fluid storage device of claim 3, wherein the burr receiver is formed to be recessed in an outer diameter portion of the holder facing an inner wall of the storage container.

5. The vehicle fluid storage device of claim 3, wherein the burr receiver is formed to be recessed in the second connector between the storage container and the holder.

6. The vehicle fluid storage device of claim 1, wherein the leak-preventing section includes at least one of an O-ring and an injection-molded backup ring.

7. The vehicle fluid storage device of claim 1, wherein the holder further includes at least one insertion member inserted into at least one connection groove formed to be recessed in the first connection area, and at least one of the insertion members has a cross-section tapered from the inside of the connection groove to the outside of the connection groove.

8. The vehicle fluid storage device of claim 1, wherein the vehicle fluid storage device further includes a reinforcing layer arranged to surround at least a part of the storage container to reinforce strength, and the reinforcing layer includes at least one of a carbon fiber composite material and a glass fiber composite material.

9. The vehicle fluid storage device of claim 1, wherein the storage container is formed by blow molding.

10. The vehicle fluid storage device of claim 1, wherein the welding includes at least one of spin welding and laser welding.

11. An assembly, the assembly comprising:

a plurality of the vehicle fluid storage devices; and a connection section configured to connect the vehicle fluid storage devices to an external device, wherein each of the vehicle fluid storage devices includes:

a storage container having a fluid storage space formed inside and an opening portion formed on at least one side;

a first connector including a first connection region arranged adjacent to the opening portion on the inside of the storage container and a second connection region extending from the first connection region so as to be connectable to the connection section;

a holder connected to the first connection region between the storage container and the first connection region and coupled to the storage container by welding;

a second connector connected to the first connector so as to surround at least a portion of the first connector, wherein the second connector is fastened to the second connection region and is contact with the holder; and a leak-preventing section configured to maintain airtightness between the first and second connectors, wherein the leak-preventing section includes:

a first ring member arranged between the holder that surrounds the first connection region and the second connector;

a second ring member arranged adjacent to an end of the holder between the first connection region and the second connection region; and a third ring member arranged between the first connection region and the second connection region.

* * * * *